July 28, 1959     J. W. EDGEMOND, JR     2,896,678
BLADE ANCHORAGE MEANS FOR MOLDING HEAD
Filed Dec. 16, 1957
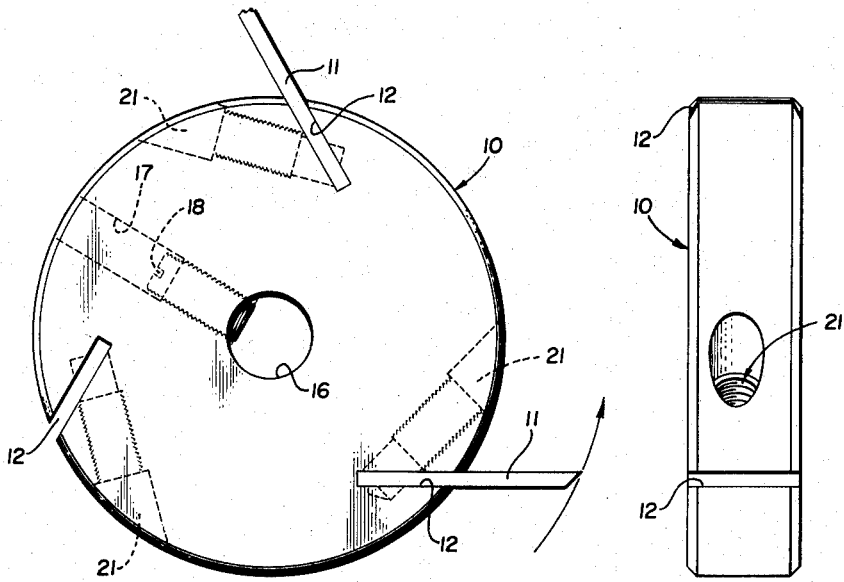
Fig. 1          Fig. 2
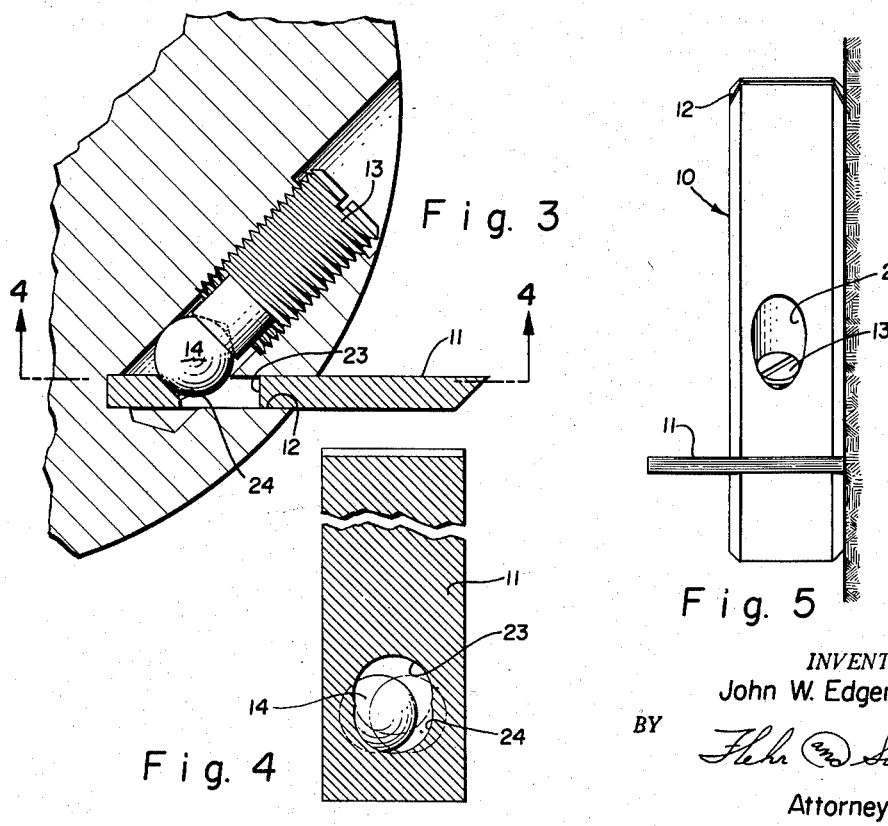
Fig. 3
Fig. 4
Fig. 5
INVENTOR.
John W. Edgemond, Jr.
BY
Attorneys

United States Patent Office 2,896,678
Patented July 28, 1959

2,896,678

BLADE ANCHORAGE MEANS FOR MOLDING HEAD

John W. Edgemond, Jr., Los Altos, Calif., assignor to Yuba Power Products, Inc., Menlo Park, Calif., a corporation of California Application December 16, 1957, Serial No. 702,883

5 Claims. (Cl. 144—235)

This invention relates to improvements in molding head and cutters and particularly to an improved means for securing the cutter bits in the head.

Molding cutter assemblies are well known and comprise generally a head or arbor adapted to be rotated and to support a plurality of circumferentially spaced cutter bits or blades which are detachably secured thereto and which extend from the periphery thereof. Each of the blades or cutter bits is adapted to be provided with a cutting edge or surface all as is well known to those skilled in the art.

In conventional practice a molding head arbor is provided with a plurality of peripherally open slots which are adapted to receive the cutter bits with the cutter bits extending from the periphery of the head. The means for securing each cutter bit in the head generally consists of a screw member which threadedly engages the arbor and which intersects the slot to frictionally engage the bit and lock the same in the slot. The cutter blade or bit may be provided with a hole through which the threaded member may pass or against one of the side walls of which the threaded member may engage. The threaded member may be provided with a pointed end which will tend to dig into the blade and tend to increase the frictional engagement between the member and the blade.

It will be appreciated that the circumferentially spaced cutter bits engage the work with substantial impact so that considerable vibration is set up in the cutters and the head and, due to such impact and vibrations, conventional means for detachably securing the cutters to their head may tend to loosen in use whereby, particularly upon continued rotation of the head or arbor, the blades or cutters may fly from the head. The dangers are too apparent to dwell upon.

It is an object of the present invention to provide an improved molding head and cutter support means that obviates the above objection and provides a safe, efficient and economical tool.

In addition it is an object of this invention to provide an improved molding head in which impact and vibration and centrifugal force which normally tend to loosen the blade are not transmitted directly from the blade to the screw element which holds the blade in the cutter head.

It is a further object of this invention to provide secondary member between the blade and the threaded member whereby rotary motion of the threaded member, when the same is being tightened against the blade, will not be imparted to the blade. Because of the positioning of the secondary member the rotation of the screw does not tend to urge the blade to one side and thus cause misalignment.

Other objects and advantages of this invention will appear from the following specification taken in conjunction with the accompanying drawings in which:

Figure 1 is a side view of a molding head showing two of the molding cutters in position.

Figure 2 is an end view showing the molding head of Figure 1 with the molding cutters removed.

Figure 3 is an enlarged cross-sectional detail showing the primary and secondary securing members positioned to secure the cutter blade in the molding head, Figure 4 is a view taken along the line 4—4 of Figure 3 showing the point of contact of the secondary member and the cutter blade, and Figure 5 is a view similar to Figure 2 showing the molding head positioned against a plane surface for adjusting the lateral position of one of the cutters.

As illustrated particularly in Figure 1 the molding head consists generally of a body 10 which is adapted to support a plurality of cutters 11 each of which is positioned in a slot 12 and each of which is secured in the slot 12 by means of primary and secondary securing members consisting of a set screw 13 and a cooperating ball 14, respectively.

The body member 10 is provided with a centrally disposed hole or aperture 16 which is adapted to be fitted over a driven shaft. A tapped bore 17 is provided and accommodates a set screw 18 which may be advanced or retracted along the bore 17 into and out of engagement with the driven shaft upon which the molding head body 10 is mounted and by which it is adapted to be driven. It is contemplated that the driven shaft will be provided with a flatted area against which the set screw 18 would engage.

As viewed particularly in Figures 2 and 3, the slot 12 which receives the bit 11 extends the width of the body 10. It is preferably provided with a flat bottom against which the flat bottom of the blade 11 is adapted to abut. The molding head 10 is adapted to be driven in a counter-clockwise direction as viewed in Figure 1 and the slots 12 may generally be said to face in the direction of rotation. I have provided a plurality of threaded bores 21 which extend inwardly from the outer periphery of the body 10 and one of the bores 21 intersects each of the slots 12 as illustrated. Each of the threaded bores 21 is adapted to receive one of the set screws 13 and one of the ball members 14. The ball 14 is adapted to be urged into the area defined by the slot 12 and to engage a cutter bit at a point in that area.

Each of the cutter bits 11 is preferably provided with a means to accommodate the ball 14. This may consist of a hole 23 as indicated in Figure 3. The lower wall of the hole 23 may be tapered as indicated at 24.

It will be noted from the foregoing that the securing means, that is the set screw 13 and the ball 14, are disposed to the forward side of the bit in the direction of rotation so that the impact on the bit when engaging the workpiece is transmitted and absorbed by the body 10 and not by the securing means. In addition the bit 11 is adapted normally to abut against the back wall and bottom in the slot 12.

An indentation in the forward face of the blade 11 may be substituted for the hole 23, it being essential primarily that there be some indentation, hole, slot or other means on the face of the blade to receive the ball 14.

The combination of a set screw 13 and a ball 14 is superior to a screw alone. I have found that when only a screw is used there is a tendency for the rotary movement of the screw to be imparted to the blade causing the blade to "walk" in the slot. Some of the prior art devices have attempted to overcome this problem by slotting the blade in such a manner that shoulders are provided on the blade. These shoulders ride along the sides on the slot and against the side walls of the molding head. With my construction this difficulty is overcome.

It will be noted in Figure 4 that the ball 14 contacts the hole or other indentation at one point only. In this manner it is possible to set the blade in a predetermined lateral position in the slot 12 and to tighten the set screw 13 without imparting any side or rotary movement to the blade 11. For example, as viewed in Figure 5, the molding body may be positioned adjacent a plane surface. When the body 10 is so positioned the blade 11 may be inserted in one of the slots 12 and in engagement with the plane surface, in which event the side of the blade will be coplanar with the side of the body 10. The screw 13 may then be advanced and the ball 14 urged into engagement with the indentation or hole in the blade 11. Because of the secondary member, the ball 14, there is no lateral urging or movement transmitted from the rotating screw 13 to the blade 10 which would urge the same laterally causing misalignment.

It will be noted that the threaded bores 21 are laterally offset with respect to the central plane of the body 10. This lateral offset facilitates the lateral adjustment of the blade with respect to the body 10.

Operation of the device may briefly be described as follows:

A selected set of molding cutters 11 are positioned in the slots 12, with their lower ends in engagement with the bottoms of each slot. The body 10 may be laid adjacent a plane surface as viewed in Figure 5 with the result that one side of each of the molding cutters 11 will be coplanar with each other and with the body 10. In this manner the lateral positioning of the blades may be determined. It likewise may be determined in any other suitable manner, as for example, by means of any gauge, etc. The primary threaded securing members 13 are urged inwardly and the secondary ball members 14 are brought into engagement with the blades 11. The engagement is preferably with an indentation, as has previously been pointed out, or with a tapered shoulder on a slot or hole 23. The member 13 is tightened until the member 14 is tightly lodged in position and the member 11 will then be firmly held against the bottom of the slot and will be laterally positioned inasmuch as the ball 14 will engage the orifice 23 or the shoulder 24 at only one point, as indicated in Figure 4.

The cutting head, with the blades 11 positioned as indicated, is then put on a driven shaft by placing the bore 16 over the shaft. The set screw 18 is tightened and brought into frictional engagement with the shaft. The cutting head is then ready for use. The blades 11 may be removed from the slots 12 simply by releasing the set screws 13 with the result that the balls 14 will be permitted to become disengaged from the blades 12, and the same may be withdrawn from the slots.

I claim:

1. In a molding head assembly comprising a head and a plurality of blades, the head having a plurality of slots which extend transversely thereof and a similar number of threaded bores intersecting said slots, each of said slots accommodating a blade, an indentation on the leading face of each of said blades, each of said threaded bores accommodating a threaded screw and a secondary member, said secondary member being adapted to engage the indentation on the forward face of said blade.

2. In a molding head of the character described which is provided with a plurality of substantially identical slots which extend transversely of the body and a similar number of threaded bores intersecting said slots, each of said slots being adapted to accommodate a blade, each of said threaded bores accommodating a threaded screw and a secondary member, said secondary member being a ball and being adapted to engage a blade in said slot.

3. In a molding head assembly comprising a head and a plurality of blades, the head being provided with a plurality of slots, each of which is adapted to accommodate a blade, a threaded bore intersecting each of said slots near its base, primary threaded member in each said threaded bore adapted to be advanced or retracted therein, a secondary member in said bore adapted to be engaged by said primary member and urged into and out of engagement with a blade in said slot, each blade being provided with an indentation, said secondary member being adapted to engage said indentation at a predetermined point thereon.

4. In a molding head of the character described which is adapted to support a plurality of blades, a head having a plurality of slots, each of which is adapted to accommodate a blade, a threaded bore intersecting each of said slots near its base, a primary threaded member in each said threaded bore and adapted to be advanced or retracted therein, a secondary member in said bore adapted to be engaged by said primary member to be urged into and out of engagement with a blade in said slot, each blade being provided with an identation near its base, said secondary member being adapted to engage said indentation at a predetermined point thereon.

5. A molding head assembly comprising a head and a plurality of blades, the head having a plurality of slots which extend transversely thereof and a similar number of threaded bores intersecting said slots, each of said slots accommodating a blade, an indentation on one face of each of said blades, each of said threaded bores accommodating a threaded screw and a secondary member, said secondary member being adapted to engage the indentation on the face of said blade.

References Cited in the file of this patent

UNITED STATES PATENTS

| | | |
|---|---|---|
| 988,227 | Thomas | Mar. 28, 1911 |
| 995,024 | Mitchell | June 13, 1911 |
| 1,478,649 | Gustafson | Dec. 25, 1923 |
| 1,705,994 | Peterson | Mar. 19, 1929 |
| 2,731,991 | Cowley | Jan. 24, 1956 |

FOREIGN PATENTS

| | | |
|---|---|---|
| 53,629 | Switzerland | July 26, 1910 |